W. D. BALLERSTEDT.
SPRINKLER SYSTEM FOR IRRIGATING LAWNS, GARDENS, FIELDS, AND THE LIKE.
APPLICATION FILED APR. 17, 1917.

1,337,744. Patented Apr. 20, 1920.

Witness
C. C. Holly.

Inventor
William D. Ballerstedt
by James R. Townsend
his atty

UNITED STATES PATENT OFFICE.

WILLIAM D. BALLERSTEDT, OF LOS ANGELES, CALIFORNIA.

SPRINKLER SYSTEM FOR IRRIGATING LAWNS, GARDENS, FIELDS, AND THE LIKE.

1,337,744.  Specification of Letters Patent.  Patented Apr. 20, 1920.

Application filed April 17, 1917. Serial No. 162,794.

*To all whom it may concern:*

Be it known that I, WILLIAM D. BALLERSTEDT, a citizen of the United States, residing at Los Angeles, in the county of Los Angeles and State of California, have invented a new and useful Sprinkler System for Irrigating Lawns, Gardens, Fields, and the like, of which the following is a specification.

An object of my invention is to provide a sprinkler system having a buried main and sprinkler nozzles connected to the main, and so constructed and arranged that the nozzles may be lowered below the ground surface when work is to be done and so that the nozzles may be raised as the vegetation grows or to accommodate a raise of lawn level.

The invention includes a lawn sprinkler system in which the nozzles are independently manipulatable for raising, lowering, tilting and regulating.

My invention consists of the novel features and combinations herein shown, described and claimed.

The invention may be applied in various ways.

The accompanying drawings illustrate the invention in two forms of construction.

Figure 1:
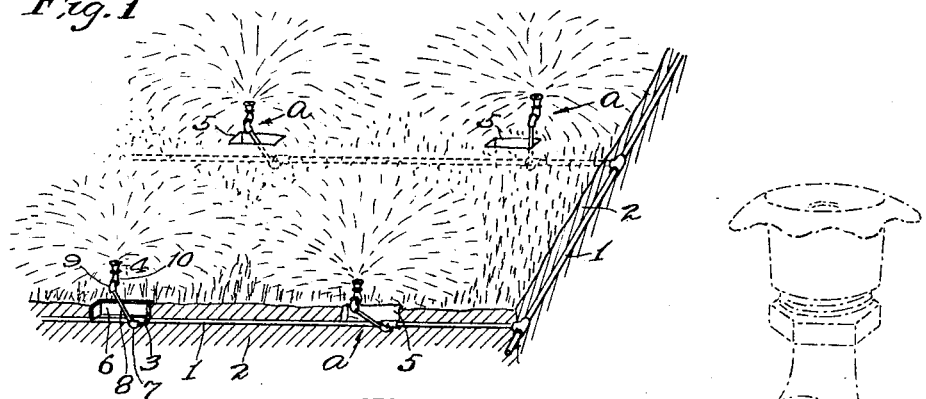

Figure 1 is a fragmentary detail of a sprinkler system, installed in a lawn, field or other tract in accordance with my invention as applied for universal adjustment of nozzle.

Figure 2:
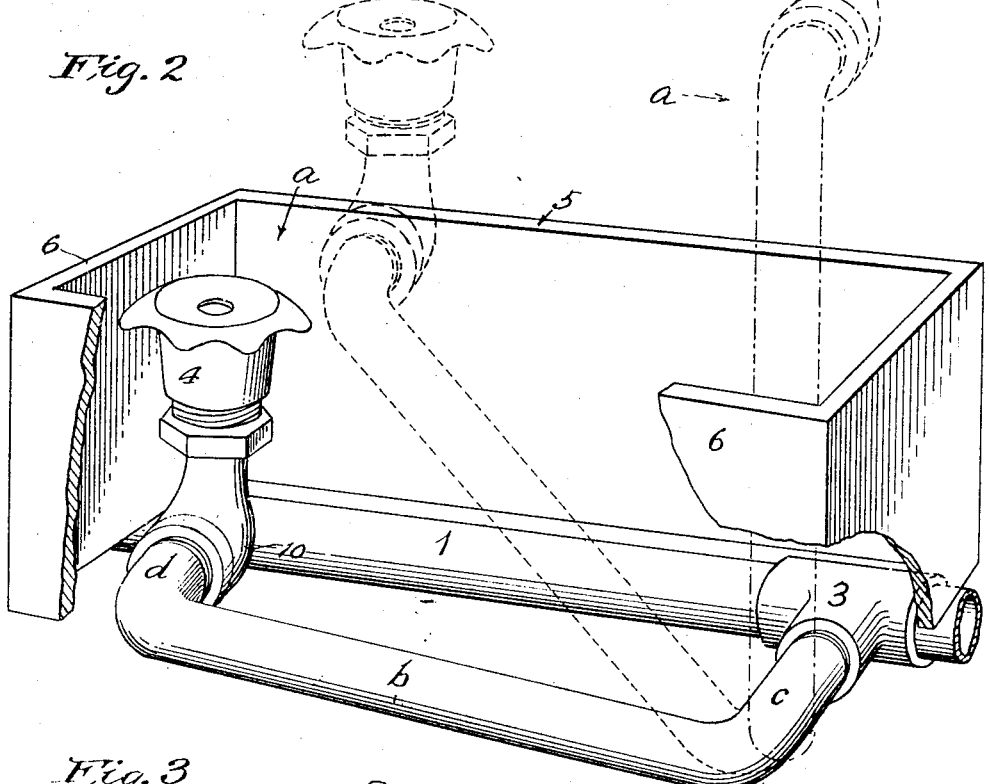

Fig. 2 is an enlarged fragmentary perspective of one sprinkler, installed in a ground recess and connected to the water main and constructed to be depressed below the level of the main. Various positions of the sprinkler are indicated by solid, broken and dot-and-dash lines. A removable recess box is also shown partly broken away.

Figure 3:
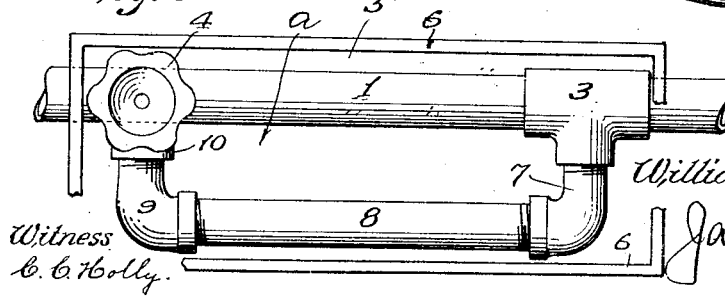

Fig. 3 is a fragmental plan view of a ground recess and the sprinkler device installed therein with universal nozzle adjustment.

The water main or supply pipe 1 is buried in the ground or soil 2 of the lawn, garden, field or other tract, a suitable distance below the surface so as to be out of the way in plowing, harrowing and the like; and in laying the main 1 the sprinkler T's 3 are incorporated wherever it may be desired to locate a sprinkler $a$. A recess 5 is formed in the ground 2 at each T, and the recesses may be lined with boxes 6.

The sprinkler nozzle 4 may be of any approved form and is connected to the main by a flexible or jointed connection which may be formed by pipe fittings or otherwise as may be most advantageous. To this end before the main 1 is buried, the T's 3 are turned so that the side openings are horizontal, and the connection for each sprinkler may include a bent nipple $b$ having parallel bent ends forming horizontal arms $c$, $d$, one of which is screwed into the T 3, and the other forming a horizontal inlet to supply the nozzle 4, which is swiveled on the arm $d$ by suitable means as the street L 10. By making arm $c$ longer than arm $d$ the sprinkler is arranged to move freely down and up past the main. In the form shown in Fig. 3, the sprinkler includes a street L 7 screwed into a T 3, a pipe nipple 8 screwed into the street L 7, a second street L 9 on the other end of the pipe nipple 8, a third street L 10 on the second street L 9, and a nozzle 4 on the third street L 10. This affords universal adjustment for the nozzle.

Of course regular L's and close nipples or any well-known suitable contrivance may be substituted for the street L's and other parts. The L 9 is parallel with the L 7 and the L 10 is turned upwardly and normally rests upon the main 1 in Fig. 3.

In burying the main 1 the recess boxes 6 may be placed around the lowered sprinklers and the soil packed around the boxes, or the boxes may be omitted and the soil packed lightly around the sprinklers and in such case, whenever it is desired to raise the nozzles 4 the soil may be dug up to form the recesses 5 or equivalents therefor, and allow the nozzles to be grasped and pulled up to the desired extent. When it is desired to lower the nozzle the soil may again be dug up sufficiently for the purpose.

The arrangement of threaded joints shown in Fig. 3 provides a universally flexible connection between the nozzle and the main so that the nozzle may be raised or lowered and leveled, or tilted in any direction at will above and below the level of the ground.

The sprinklers may be lowered below the surface of the soil to any desired extent.

In a lawn, meadow, or the like, it is sufficient to lower the nozzle below the surface so that the mower may pass, while in cultivated gardens and fields it may be desirable to lower the nozzles out of the way of plows, harrows and the like, and then the boxes 6 may be removed during cultivation or they may be omitted altogether.

By making the short connection between the main and nozzle out of pipe fittings forming flexible joints, said joints are made stiff enough to hold the sprinkler in position where put.

In Fig. 2 the nipple *b c d* may be a casting or may be a single piece of pipe bent at its ends to form equivalents for the L's. It is desirable that there be at least one screw or swivel joint between the horizontal arms so that the nozzle may be tilted transversely of the main.

The horizontal L 7 on the arm *c* may be long enough to allow the L 10 and the nozzle 4 to go down beside the main 1, as where it is desired to lower the nozzle some considerable distance below the surface of the soil, for cultivating; and of course unions and fittings may be substituted for any one or more of the screw-threaded joints between the main and the nozzle.

The arm *d* and the L 9 are alike in function in that they form horizontal inlet for the vertical nozzle 4.

It is understood that a well known form of ball and socket joint may be employed where desired to take the place of the joint constructed as shown in Figs. 1, 2 and 3, to allow the sprinkler nozzle to be adjusted to a required angle, or to a desired height or level, as in the cases shown.

I claim:

1. In a sprinkling system, a water main below the ground surface, a T joint in said main having a stem laterally positioned with respect to said main, a U-shaped pipe having both ends threaded, one end of which is screwed into the stem of said T joint, an L screwed onto the other end of the U, and a sprinkling nozzle screwed onto said L, all said joints being loose enough to allow them to be turned in order to raise or depress the nozzle above or below the ground surface and below the nozzle in any direction for sprinkling.

2. In a sprinkling and irrigating system in combination with an underground water main comprising in its length an adjustable T joint, a casing over said T joint having an opening at the ground surface, a sprinkler nozzle; a U-shaped pipe one end of which is screwed movably in the said T joint and the other end connected by an L joint movably to the sprinkler nozzle, so that the nozzle may be raised out of the casing and above the surface of the ground to any angle for sprinkling and depressing alongside the main in the casing below the surface of the ground to allow plowing or tilling of the surface.

In testimony whereof I have hereunto set my hand at Los Angeles, California, this 9th day of April, 1917.

WILLIAM D. BALLERSTEDT.

Witness:
JAMES R. TOWNSEND.